United States Patent
Lockamon et al.

(10) Patent No.: US 9,280,688 B2
(45) Date of Patent: Mar. 8, 2016

(54) APPARATUS AND METHOD FOR LIMITING AND ANALYZING STRESS CORROSION CRACKING IN PRESSURIZED WATER REACTORS

(71) Applicant: AREVA NP INC, Lynchburg, VA (US)

(72) Inventors: Brian Glenn Lockamon, Evington, VA (US); William Edward Allmon, Lynchburg, VA (US); Stephen Fyfitch, Moon Township, PA (US); John Carroll Griffith, Lynchburg, VA (US)

(73) Assignee: AREVA Inc., Lynchburg, VA (US)

( * ) Notice: Subject to any disclaimer, the term of this patent is extended or adjusted under 35 U.S.C. 154(b) by 0 days.

(21) Appl. No.: 13/930,632

(22) Filed: Jun. 28, 2013

(65) Prior Publication Data

US 2014/0010339 A1    Jan. 9, 2014

Related U.S. Application Data

(63) Continuation of application No. 11/069,535, filed on Feb. 28, 2005, now abandoned.

(51) Int. Cl.
| | | |
|---|---|---|
| G21C 9/00 | (2006.01) | |
| G06G 7/54 | (2006.01) | |
| G21C 17/00 | (2006.01) | |
| G21C 17/022 | (2006.01) | |

(52) U.S. Cl.
CPC .......... G06G 7/54 (2013.01); G21C 17/00 (2013.01); G21C 17/022 (2013.01); G21C 17/0225 (2013.01)

(58) Field of Classification Search
None
See application file for complete search history.

(56) References Cited

U.S. PATENT DOCUMENTS

| | | | |
|---|---|---|---|
| 3,580,934 A | | 5/1971 | Wright et al. |
| 4,625,165 A | * | 11/1986 | Rothstein ............ 324/220 |
| 4,756,874 A | | 7/1988 | Ruiz et al. |
| 4,950,449 A | | 8/1990 | Petersen et al. |
| 5,108,697 A | | 4/1992 | Esposito et al. |
| 5,171,515 A | | 12/1992 | Panson et al. |
| 5,181,533 A | | 1/1993 | Kooi |
| 5,600,691 A | | 2/1997 | Hettiarachchi et al. |
| 5,818,893 A | | 10/1998 | Hettiarachchi |
| 5,995,576 A | | 11/1999 | Midorikawa et al. |
| 6,314,153 B1 | * | 11/2001 | Henzel et al. ............ 376/306 |
| 6,415,010 B2 | | 7/2002 | Kim et al. |
| 6,473,480 B1 | | 10/2002 | Kruger et al. |
| 6,714,618 B1 | | 3/2004 | Hettiarachchi et al. |
| 6,944,254 B2 | | 9/2005 | Kormuth et al. |

(Continued)

FOREIGN PATENT DOCUMENTS

WO    0022627 A1    4/2000

OTHER PUBLICATIONS

Parkins, R.N., Predictive approaches to stress corrosion cracking failure, Corrosion Science, 1980, vol. 20, 2, pp. 147-166.*

(Continued)

*Primary Examiner* — Jack W Keith
*Assistant Examiner* — Sharon M Davis
(74) *Attorney, Agent, or Firm* — Davidson, Davidson & Kappel, LLC

(57) ABSTRACT

A method to assess and predict pressurized water stress corrosion cracking in operational nuclear power plants and the effect of adding zinc compounds into a reactor coolant system of the nuclear power plant.

10 Claims, 4 Drawing Sheets

(56) References Cited

U.S. PATENT DOCUMENTS

2002/0118787 A1     8/2002    Andresen et al.
2002/0191731 A1    12/2002    Marble
2005/0105670 A1     5/2005    Kormuth et al.

OTHER PUBLICATIONS

Scott, P.M., Stress Corrosion Cracking in Pressurized Water Reactors—Interpretation, Modeling, and Remedies, Corrosion, 2000, vol. 56, 8, pp. 771-782.*

Palmer et al., "New Measurements of the Solubility of Metal Oxides at High Temperatures" Aqueous Systems at Elevated Temperatures and Pressures, ORNL 2004.*

Andersen, P.L. et al., "Effects of Zinc Additions on the Crack Growth Rate of Sensitized Stainless Steel and Alloys 600 and 182 in 288° C. Water", Water Chemistry of Nuclear Reactor Systems 6, BNES, London, 1992, Paper No. 72.

Kawamura, H. et al., "The Effect of Zinc Addition to Simulated PWR Primary Water on the PWSCC Resistance, Crack Growth Rate and Surface Oxide Film Characteristics of Prefilmed Alloy 600", Corrosion 98, NACE International, Houston, 1998, Paper No. 141.

Kawamura, H. et al., "Inhibitory Effect of Zinc Addition of High-Temperature Hydrogenated Water on Mill-Annealed and Prefilmed Alloy 600", Corrosion (2000), vol. 56:6, pp. 623-637.

Shin, M. et al., "Deposition of inertia-dominated particles inside a turbulent boundary layer", International Journal of Multiphase Flow (2003), vol. 29, pp. 893-926.

AcademicPress Dictionary of Science and Technology, "Solubility" (1992, 1996), credoreference.com/entry/3160396.

Solubility Factors in "Post-Fermentation Hop Product Additions" by Barth-Haas Group © 2006, Hop Products Australia, 26 Cambridge Road, Bellerive Tasmania 7018.

Third party observations regarding Andersen and Kawamura.

* cited by examiner

APPARATUS AND METHOD FOR LIMITING AND ANALYZING STRESS CORROSION CRACKING IN PRESSURIZED WATER REACTORS

FIELD OF THE INVENTION

The present invention relates to limiting pressurized water stress corrosion cracking (PWSCC) in pressurized water reactors. More specifically, the present invention provides an apparatus and method for limiting stress corrosion cracking in a pressurized water reactor (PWR) through the addition of low-level concentrations of zinc compounds into a reactor coolant system (RCS). The current invention also provides a method for evaluating the effect of and applying zinc acetate to the RCS of PWRs at a target zinc concentration of 5 ppb (operating range of 3 to 8 ppb) in order to reduce the initiation rate of PWSCC. The developed methodology provides for the steps of quantitatively assessing the PWSCC initiation rate of a candidate system through evaluating operational Eddy Current Testing (ET) data and PWSCC failure history using empirical and mathematical relationships, determining the extent of damage to the candidate system, approximating the point in plant life where zinc addition is needed for PWSCC mitigation, quantitatively assessing the PWSCC initiation benefit for various high-concentration ($\geq 10$ ppb) and low-concentration (<10 ppb) zinc programs, demonstrating a PWSCC initiation benefit from zinc at low concentrations (<10 ppb) in the RCS and applying zinc acetate to the RCS at concentrations of 1 to 10 ppb for PWSCC mitigation.

BACKGROUND INFORMATION

Stress corrosion cracking occurs in a material due to a combination of a corrosive environment and tensile forces placed on the material. Cracking can be induced in materials in different ways including cold forming, welding, grinding, machining, and heat treatment as well as other physical stresses placed on the material. Stress corrosion cracking in nuclear reactor environments is a significant phenomenon that must be carefully monitored for successful operation of a nuclear power plant facility. Without careful monitoring for PWSCC, material defects may begin and may ultimately damage the material. If cracking continues, the materials may be damaged to such an extent that the materials must be removed from service and replaced. In the nuclear reactor environment, such replacement of components is extremely undesirable due to radiological concerns related to worker and facility safety, as well as overall plant economic concerns.

In Boiling Water Reactors (BWRs), different methodologies are used to limit corrosion on reactor water systems. Some methodologies include application of hydrogen water chemistry to limit the overall nuclear reactor environment of these water systems to a more reducing state. The application of hydrogen water chemistry has significant drawbacks, however, in that radiation levels in systems connected to the reactor often increase dramatically, posing a significant risk for workers and equipment. Other methodologies relate to placement of noble metals on the reactor water systems in order to limit the amount of voltage difference between differing reactor water system areas as defined in the standard hydrogen electrode scale. Through experimentation it has been found that values above approximately $-0.230$ to $-0.300$ V result in stress corrosion cracking. The placement of noble metals such as iridium, platinum, palladium and rhodium in key corrosion-prone positions has been found to help in limiting damage to reactor water systems by decreasing these harmful values. In new construction, the components may be coated with these metals, thereby providing protection. For nuclear power plants already in operation this alternative is not practical as the components in question must be removed from service and replaced with new components.

In an effort to increase the corrosion resistance of existing nuclear power plant facilities, injection of noble metals into the reactor coolant water stream itself has been found to help improve resistance to stress corrosion cracking. The noble metals are passed into the reactor coolant water stream where these metals coat the insides of various components in the nuclear power plant environment. The noble metals further deposit on an outside layer of the system to be protected. The noble metals decrease the electrochemical corrosion potential of the systems and therefore help to protect the overall system integrity.

Zinc, in the form of zinc oxide, zinc acetate, or zinc borate, has been used in the commercial nuclear industry for a number of years in order to reduce radiation dose rates of system components in both PWRs and BWRs. In order to achieve these dose reduction benefits, zinc has been applied at concentrations of between 5 to 10 ppb in BWRs and 3 to 8 ppb in PWRs.

Laboratory testing has demonstrated that applying high concentrations of zinc ($\geq 10$ ppb) may be beneficial in reducing the initiation of PWSCC in PWRs. Some operating United States PWRs currently use zinc at concentrations of 20 to 40 ppb in the reactor coolant, which is believed by the industry, including the Electric Power Research Institute (EPRI), to achieve PWSCC protection; however, no definitive evidence of the magnitude of benefit, if any, has been available to the industry.

Analysis of laboratory test data in open literature indicates that certain types of addition of zinc to the primary water systems in nuclear facilities may be expected to provide a reduction in the initiation rate of PWSCC in Alloy 600 components. A combined project conducted by Airey et al. in 1996 and Angell et al. in 1999 was performed in two test phases. The Phase 1 test consisted of exposing reverse U-bends (RUBs), bent beams (6% and 12% plastic strain) and pre-cracked compact wedge open loading (WOL) samples from various heats of Alloy 600 and Alloy 690 materials. During Phase 1, the specimens were exposed to simulated PWR conditions for a 12-month fuel cycle (1,200 ppm B, 2.2 ppm Li, and 25-50 cc/kg $H_2$). The specimens were exposed in two autoclaves for up to 7,500 hours at 350° C. (662° F.). Zinc was injected into one of the autoclaves, with a target concentration of approximately 40 ppb in the effluent. In order to achieve this target concentration, an initial dose of 100 ppm was used to condition the system.

After 7,500 hours of exposure in the autoclave the RUB specimens exhibited a low incidence of cracking wherein only two zinc specimens and one control specimen cracked. This number of cracked specimens was below an anticipated number of cracked specimens, however the test results did not allow the researchers to draw any meaningful conclusions. An additional result of the testing was that the bent beam specimens tended to exhibit surface crazing, rather than defined cracking. The crazing was attributed to a cold worked surface layer present on the original material. The testing results of the WOL specimens indicated that zinc addition had no effect on crack growth rate.

The above experimental results indicated that zinc injection had little impact on cracking of metal specimens undergoing test conditions. The researchers also observed that the oxide film thickness on specimens exposed to zinc were thinner, 35 nm versus 230 nm on the control specimens. This led the researchers to question whether the stress was too high on the WOL specimens (loaded to 40 MPa$\sqrt{m}$) to identify an effect of adding zinc. Researchers, however, planned a second set of tests, Phase 2.

Under the Phase 2 testing, the same types of specimens and material heats were used. WOL specimens loaded to 25 MPa$\sqrt{m}$ and 40 MPa$\sqrt{m}$ were included in the test matrix. Additionally, the chemistry environment was modified to reflect an 18-month fuel cycle (1,800 ppm B, 3.5 ppm Li, and 25-50 cc/kg $H_2$).

The result of the Phase 2 tests showed a benefit in the reduction of crack initiation for the Alloy 600 materials from the addition of zinc at high dose concentrations. The RUB samples (results provided in Table 1) showed fewer specimens cracked (up to 67% fewer) in the autoclave containing 40 ppb zinc. Additionally, it was noted that none of the 16 bent beam specimens exposed to zinc cracked, while 6 of the 16 control specimens cracked. These results are provided in Table 2. These results led the researchers to conclude that high levels of zinc addition had a definite impact on PWSCC initiation. Researchers did not, however, explore the effects of low levels of zinc addition.

The results of the WOL crack propagation specimens, however, were consistent with Phase 1 in that no benefit from zinc injection was found, as shown in FIG. 1. Analysis of the fracture surfaces of the control and zinc-exposed specimens revealed no discernable differences in the oxides. These results led the researchers to conclude that zinc most likely was not being transported to the crack tip and therefore had no impact on crack propagation.

Tests were also performed by Kawamura et al. in 1998 and 2000 using mill annealed Alloy 600 tubing and plate in order to evaluate zinc effects on both PWSCC initiation and propagation. Initiation was studied using slow strain rate tests (SSRT) of tubing material at 360° C. (680° F.) in water containing 50 ppm B, 2.2 ppm Li, 25 cc $H_2$/kg $H_2O$, and (for zinc tests) 10 ppb Zn. Propagation was studied using double cantilevered beam (DCB) specimens wedge loaded from <10 to >70 MPa$\sqrt{m}$.

In many cases, the test specimens were pre-filmed by exposing them to water containing 50 ppm B, 2.2 ppm Li, and 25 cc/kg $H_2$ (both with and without 10 ppb Zn) for up to 2,000 hours prior to testing. Later testing revealed little difference between specimens that were pre-filmed and those that were not.

TABLE 1

RUB Test Conditions and Results (662° F.) by Angell et al.

| | Phase 1, simulating beginning of cycle water for a 12-month fuel cycle | | Phase 2, simulating beginning of cycle water for an 18-month fuel cycle | |
|---|---|---|---|---|
| | Without zinc | With zinc | Without zinc | With zinc |
| Zinc | — | 40 ppb | — | 40 ppb |
| Temperature | 350° C. (662° F.) | | 350° C. (662° F.) | |
| Hydrogen | 25-50 cc $H_2$/kg $H_2O$ or 0.1 MPa | | 25-50 cc $H_2$/kg $H_2O$ or 0.1 MPa | |
| B | 1200 mg/kg B as $H_3BO_3$ | | 1800 mg/kg B as $H_3BO_3$ | |
| Li | 2.2 mg/kg Li as LiOH | | 3.5 mg/kg Li as LiOH | |
| pH | 6.75 at 292° C. and 7.10 at 350° C. | | 6.75 at 292° C. and 7.10 at 350° C. | |

| | | Phase 1 | | Phase 2 | | | |
|---|---|---|---|---|---|---|---|
| | | Without zinc | With zinc | Without zinc | | With zinc | |
| Specimen I.D. | Heat | 7500 hours | 7500 hours | 5500 hours | 7500 hours | 5500 hours | 7500 hours |
| Alloy 600 Studsvik | 96834,[c] Alloy 600MA | 1/6 | 2/6 | 3/6 [a] | 3/6 [a] | 1/6 [a] | 1/6 [a] |
| Alloy 690 Studsvik | 752245,[c] Alloy 690TT | 0/6 | 0/6 | 0/4 [a] | 0/4 [a] | 0/4 [a] | 0/4 [a] |
| Alloy 600 Westinghouse | Not listed | — | — | 1/4 | 3/4 | 0/4 | 2/4 |

[a] Include two uncracked specimens carried forward from Phase 1. However, for Alloy 600, it was not mentioned if the cracked ones in Phase 2 included the ones from Phase 1. For Alloy 690, the maximum specimen exposure time without failure was 15,000 hours.
(b) x/y—x is the accumulated number of specimens cracked; y is the total number of RUB specimens tested.
[c] The descriptions on the RUB specimen I.D. were vague and could not be associated directly with the chemical composition of the Alloy 600 and Alloy 690 SG tubes listed. Hence, the specimen heat number was an educated guess.

TABLE 2

Alloy 600 Phase 2 Bent Beam Results

| ZINC ADDITION | HEAT | PLASTIC STRAIN (%) | SUR-FACE* | SPECIMENS CRACKED/EXPOSED | |
|---|---|---|---|---|---|
| | | | | 2750 HOURS | 5500 HOURS |
| YES | A | 6 | AM | 0/4 | 0/4 |
| YES | B | 6 | AM | 0/4 | 0/4 |
| YES | A | 12 | EP | 0/4 | 0/4 |
| YES | B | 12 | EP | 0/4 | 0/4 |
| NO | A | 6 | AM | 0/4 | 1/4 |
| NO | B | 6 | AM | 0/4 | 0/4 |
| NO | A | 12 | EP | 1/4 | 4/4 |
| NO | B | 12 | EP | 0/4 | 1/4 |

*AM—as machined; EP—electropolished

The SSRT results were reported in terms of "fracture ratios" (i.e., fraction of specimen that showed PWSCC failure). The testing showed a sharp decrease in fracture ratios as a function of zinc concentration between 0 and 10 ppb zinc (see FIG. 2) and a decrease by a factor of two for specimens exposed to zinc; 10-15% versus 20-30% in the control specimens (see FIG. 3).

The crack propagation tests were monitored by periodically removing and fracturing some of the specimens and measuring crack advancement. The results of these tests indicated that crack rates (most likely also including the initiation times into the calculation) were approximately 10 times lower for the zinc environments as provided in FIG. 4. It should be noted that in all cases, the crack growth rates were low. It should also be noted that, contrary to previous studies the researchers found chromite spinel oxides, which can incorporate zinc, in the crack tip.

Research reports have been provided to the Electric Power Research Institute by the Nuclear Power Engineering Corporation (NUPEC) in which the effect of zinc additions on PWSCC have been evaluated. Some of the project details have been published in the open literature. A materials integrity test was performed in a large loop specifically designed and constructed in generating these reports. The types of testing included SSRT, constant load RUB tests, and constant strain RUB tests.

Slow Strain Rate Tests

Slow strain rate testing was performed at 370° C. (698° F.) with a strain rate of 0.5 μm/minute. Three SSRT environmental conditions were used, as shown in Table 3.

TABLE 3

Slow Strain Rate Test Conditions

| TEST NO. | BORON (PPM) | LITHIUM (PPM) | ZINC (PPB) |
|---|---|---|---|
| 1 | 280 | 2.0 | 10 |
| 2 | 1800 | 3.5 | 10 |
| 3 | 1800 | 3.5 | 0 |

Four specimens were included in each SSRT environment. All specimens were prefilmed in primary water conditions containing 10 ppm zinc. The reported fracture ratios were all approximately 10% as shown in FIG. 5, indicating that the presence of 10 ppb zinc had no effect on the PWSCC susceptibility in these B and Li environments.

Constant load testing of Alloy 600 MA and Alloy 600 TT tubing was performed at 340° C. (644° F.). Alloy 690 TT tubing was also included and tested at 360° C. (680° F.). All specimens were strain hardened prior to testing at 60 kg/mm² and the applied testing load was equivalent to a tensile stress of 588 MPa. The Alloy 690 TT material was not prefilmed; the Alloy 600 TT material was prefilmed in primary water with the addition of 10 ppb zinc; and the Alloy 600 MA material was prepared in three conditions: a) without prefilming, b) prefilmed in primary water only, and c) prefilmed in primary water with the addition of 10 ppb zinc. The prefilming was performed after the strain hardening treatment. The Alloy 600 MA material results are the only ones reported in the literature and are provided in Table 4. The use of prefilming made little to no difference in the test results. Also, the testing performed in the 10 ppb zinc environment (Environment B) appears to show only marginal improvement in the failure times.

Constant strain tests were performed using RUB specimens made from both Alloy 600 MA and Alloy 600 TT materials. Alloy 690, Alloy X-750, Type 316, and Type 304 materials were also included, but the data were not presented in the references. A matrix of environmental test conditions, strain levels and prefilming was employed as shown in Table 5.

The test results indicate that for Alloy 600 MA materials, prefilmed specimens tend to crack more than non-prefilmed specimens, particularly under 5% strain. Higher strain conditions showed no beneficial effect of zinc addition. The test results for Alloy 600 TT material appeared to show a small improvement in PWSCC resistance in the zinc environments. The authors concluded from these test results that PWSCC susceptibility of Alloy 600 MA and TT materials was essentially the same or somewhat lower in a 10 ppb zinc environment compared to a water environment of a typical primary water system in a nuclear power plant.

TABLE 4

Constant Load Test Results for Alloy 600 MA Material

| | | ENVIRONMENT A* | | ENVIRONMENT B** |
|---|---|---|---|---|
| PREFILM CONDITION | SPECIMEN NO. | RUPTURE TIME, HR | SPECIMEN NO. | RUPTURE TIME, HR |
| NO ZINC | 6M-301 | 8987 | 6M-311 | 8389 |
| | 6M-302 | 8862 | 6M-312 | 5725 |
| | 6M-303 | 8439 | 6M-313 | >9228 |
| | 6M-304 | 8689 | 6M-314 | 7367 |
| | 6M-305 | >9228 | 6M-315 | >9228 |
| | 6M-306 | 5798 | 6M-316 | >9228 |
| | 6M-307 | 7885 | 6M-317 | >9228 |
| | 6M-308 | >9228 | 6M-318 | 9129 |
| | 6M-309 | >9228 | 6M-319 | >9228 |
| | 6M-310 | 5096 | 6M-320 | 9214 |
| 10 PPB ZINC | 6M-321 | 9202 | 6M-331 | >9228 |
| | 6M-322 | 8917 | 6M-332 | 7191 |
| | 6M-323 | 6985 | 6M-333 | 6836 |
| | 6M-324 | 4938 | 6M-334 | >9228 |
| | 6M-325 | 4337 | 6M-335 | >9228 |
| | 6M-326 | 6704 | 6M-336 | 4719 |
| | 6M-327 | 6419 | 6M-337 | 4789 |
| | 6M-328 | 8076 | 6M-338 | 8934 |
| | 6M-329 | 7666 | 6M-339 | 8206 |
| | 6M-330 | 4850 | 6M-340 | 7650 |

*Environment A: 280 ppm boron and 2.0 ppm lithium
**Environment B: 280 ppm boron, 2.0 ppm lithium, and 10 ppb zinc

TABLE 5

Constant Strain RUB Testing of Alloy 600 Materials

| MATERIAL | PREFILM CONDITION* | ENVIRONMENT A+ PRE-STRAIN LEVEL | | | ENVIRONMENT B+ PRE-STRAIN LEVEL | | | ENVIRONMENT C+ PRE-STRAIN LEVEL | | |
|---|---|---|---|---|---|---|---|---|---|---|
| | | 5% | 10% | 15% | 5% | 10% | 15% | 5% | 10% | 15% |
| ALLOY 600 MA | NONE | 1/10 | 10/10 | 10/10 | 1/10 | 10/10 | 9/10 | 3/10 | 8/10 | 8/10 |
| | PW | 4/10 | 10/10 | ALL # | 4/10 | 10/10 | ALL # | 8/10 | 10/10 | 10/10 |
| | PW + 10 PPB ZN | 7/10 | 10/10 | ALL # | 5/10 | 10/10 | ALL # | — | — | — |

TABLE 5-continued

Constant Strain RUB Testing of Alloy 600 Materials

| MATERIAL | PREFILM CONDITION* | ENVIRONMENT A+ PRE-STRAIN LEVEL | | | ENVIRONMENT B+ PRE-STRAIN LEVEL | | | ENVIRONMENT C+ PRE-STRAIN LEVEL | | |
|---|---|---|---|---|---|---|---|---|---|---|
| | | 5% | 10% | 15% | 5% | 10% | 15% | 5% | 10% | 15% |
| ALLOY 600 TT | PW + 50 PPB ZN | — | — | — | — | — | — | 9/10 | 9/10 | 10/10 |
| | PW | — | — | — | — | — | — | — | — | — |
| | PW + 10 PPBZN | 0/10 | 0/10 | 5/10 | 0/10 | 0/10 | 3/10 | — | — | — |
| | PW + 50 PPB ZN | — | — | — | — | — | — | 0/10 | 1/10 | 4/10 |

Note:
Results for 0 and 10 ppb zinc are after 9228 hours; results for 50 ppb zinc are after 5005 hours; and "All #" indicates all specimens cracked at 5010 hours
*Prefilmed 2000 hours in primary water (PW) environment with or without zinc
+Environment A: 280 ppm boron, 2.0 ppm lithium at 320° C.; Environment B: A + 10 ppb zinc; and Environment C: A + 50 ppb zinc Zinc addition has been applied to a number of PWRs in the United States and abroad for the purposes of radiation source term reduction (5 ppb Zn in the reactor water) and PWSCC initiation reduction (20 to 40 ppb Zn in the reactor water). Several studies of these programs, including the results of the field applications, can be found in various EPRI topical reports. None of these reports, however, identified any relationship between the addition of zinc and reduction in pressurized water reactor stress corrosion cracking.

Limitations of Background References

The laboratory data recited above on the effect of low-concentration zinc addition (≤10 ppb in the reactor coolant) regarding the initiation of PWSCC is not comprehensive. Because of the large costs and schedule requirements of zinc addition studies, the various testing programs contain fragmentary information about zinc and its effects on water systems of a nuclear reactor water system.

The field application studies of zinc addition, furthermore, have focused on two "known" applications of zinc. First, zinc has been applied at concentrations of approximately 5 ppb in the reactor coolant, and the resulting effects on the plant radiation fields (generally secondary systems) have been studied. Secondly, zinc has been applied at a concentration of 20 to 40 ppb, and the effect on the initiation rate of PWSCC has been studied, although a definitive quantification of the measure of improvement has not been determined.

There are two major shortcomings of the current knowledge base: 1) the quantitative prediction of the benefit of zinc on PWSCC at candidate plants and 2) the application of zinc at low-concentrations (<10 ppb) for the purpose of PWSCC initiation mitigation.

There is therefore a need to provide an apparatus and method to protect a pressurized water reactor from stress corrosion cracking wherein the application of materials to limit the stress corrosion cracking must be at low zinc concentration levels of less than 10 ppb.

There is an additional need to provide an apparatus and method to protect currently operating pressurized water reactors from stress corrosion cracking without unduly increasing radiation levels for workers and equipment associated with reactor water coolant systems.

There is also a need to provide an apparatus and method to protect currently operating pressurized water reactors from stress corrosion cracking in an economical and non-damaging way for the nuclear fuel present in the reactor.

SUMMARY

It is therefore an objective of the present invention to provide an apparatus and method to protect a pressurized water reactor from stress corrosion cracking wherein the application of materials to limit the stress corrosion cracking must be at low zinc concentration levels of less than 10 ppb.

It is also an objective of the present invention to provide an apparatus and method to protect operational pressurized water reactors from stress corrosion cracking without unduly increasing radiation levels for workers and equipment associated with reactor water coolant systems.

It is a further objective of the present invention to provide an apparatus and method to protect operational pressurized water reactors from stress corrosion cracking in an economical and non-damaging way for the nuclear fuel present in the reactor.

The objectives of the present invention are achieved as illustrated and described. The present invention provides a method to evaluate the effect of applying a zinc compound to a reactor coolant system of a pressurized water reactor, the method disclosing the steps of quantitatively assessing a pressurized water reactor stress corrosion cracking initiation rate of a candidate system through analysis of operational eddy current testing data and pressurized water stress corrosion cracking failure history using empirical relationships, determining an extent of damage to the candidate system, approximating when zinc addition to the system will mitigate pressurized water stress corrosion cracking, quantitatively assessing pressurized water stress corrosion cracking initiation benefit for high-concentration (≥10 ppb) and low-concentration (<10 ppb) zinc addition programs, and calculating a pressurized water reactor stress corrosion cracking initiation benefit from zinc addition at low concentrations (<10 ppb) in the reactor coolant system.

DETAILED DESCRIPTION

Figure 1:
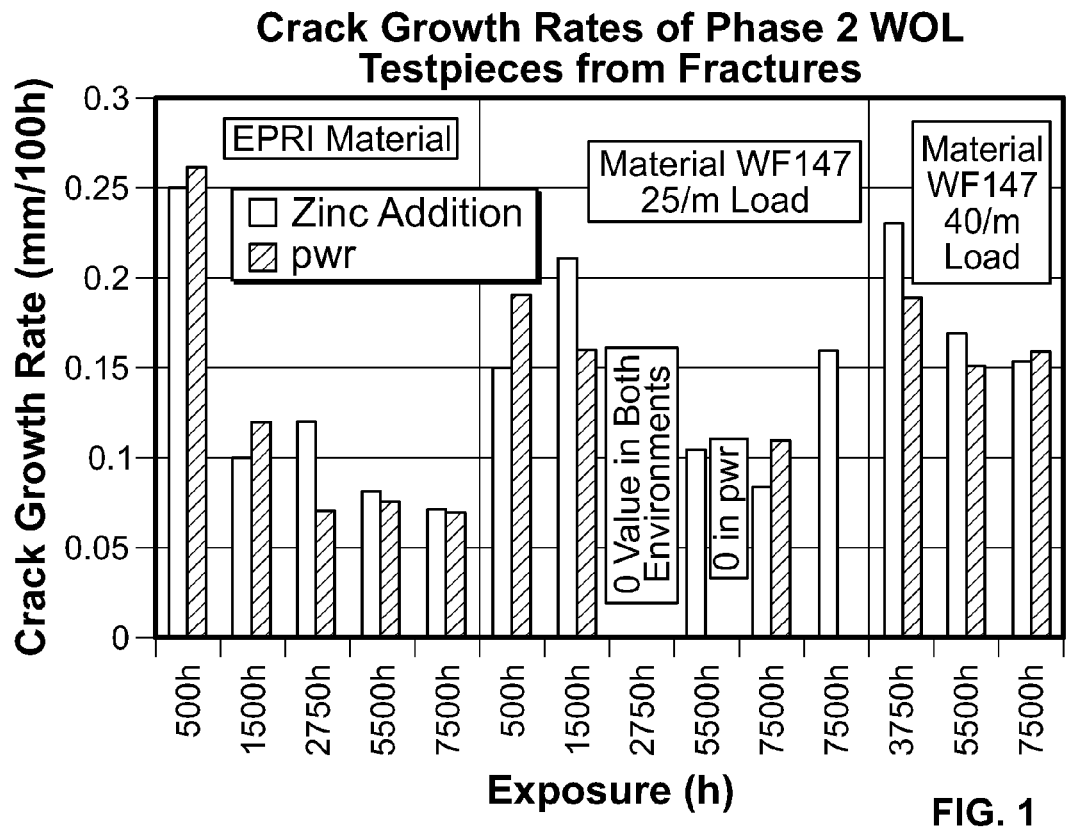
FIG. 1 is a graph of crack growth rates in WOL samples in phase 2 zinc addition tests by Angell et al.
Figure 2:
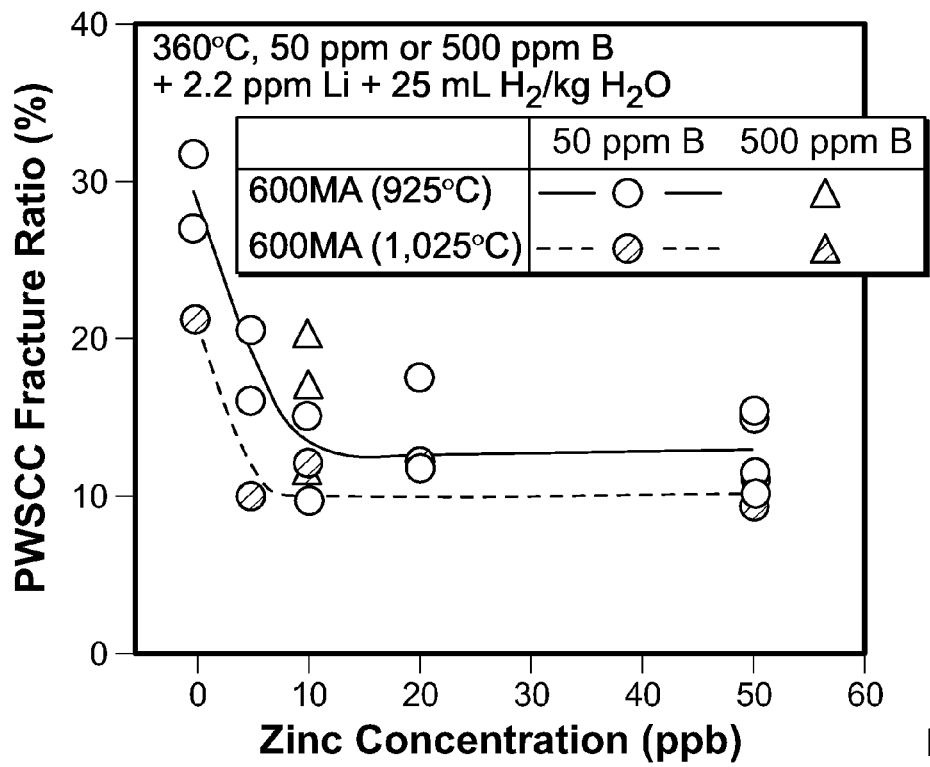
FIG. 2 is a graph of the effect of zinc concentration on PSWCC fracture ratios of alloy 600 MA material.
Figure 3:
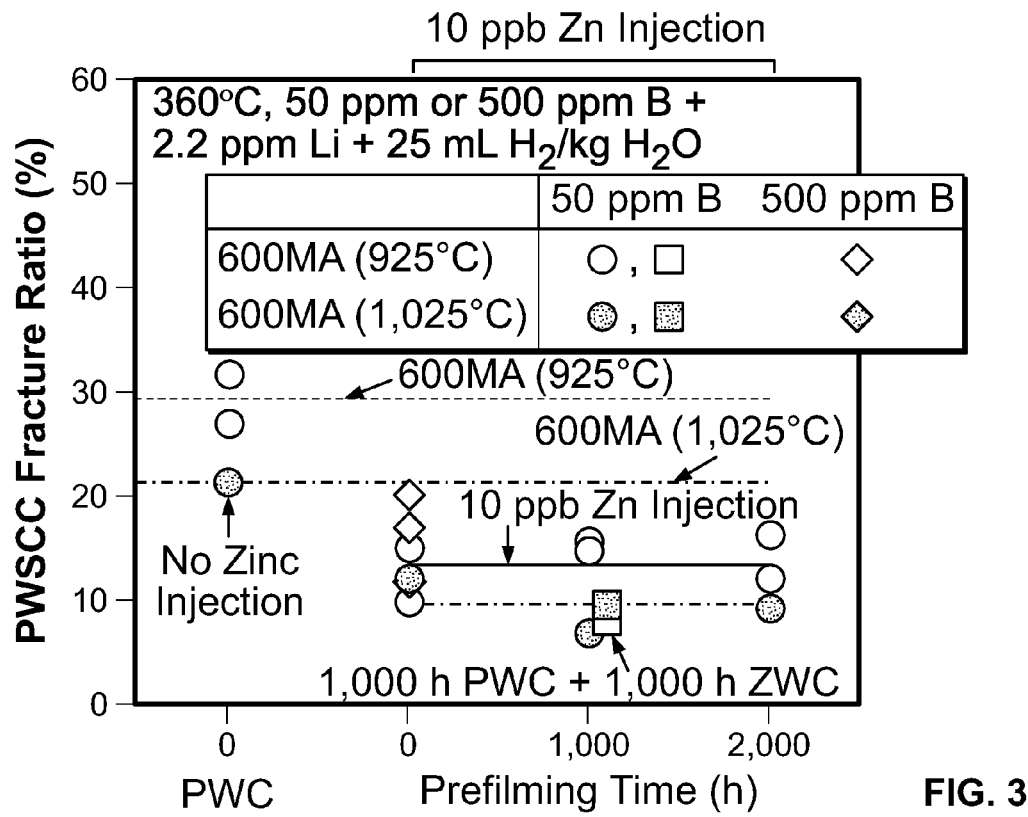
FIG. 3 is a graph illustrating the effect of zinc and prefilming time on PSWCC fracture ratio of alloy 600 MA material.
Figure 4:
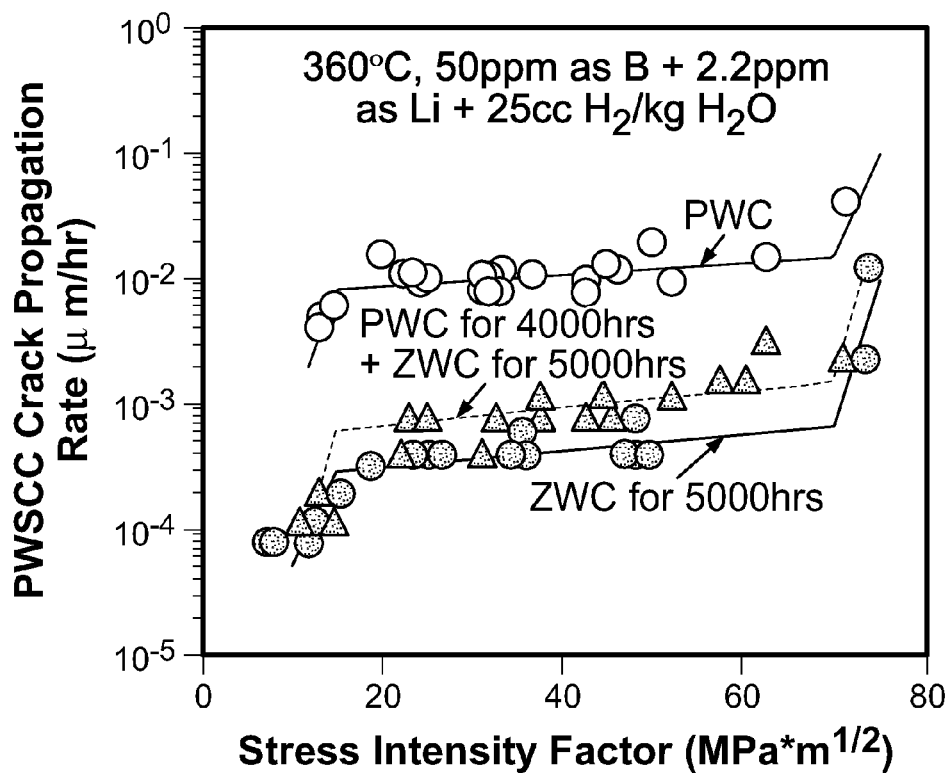
FIG. 4 is a graph illustrating PWSCC crack growth rates of alloy 600 material.
Figure 5:
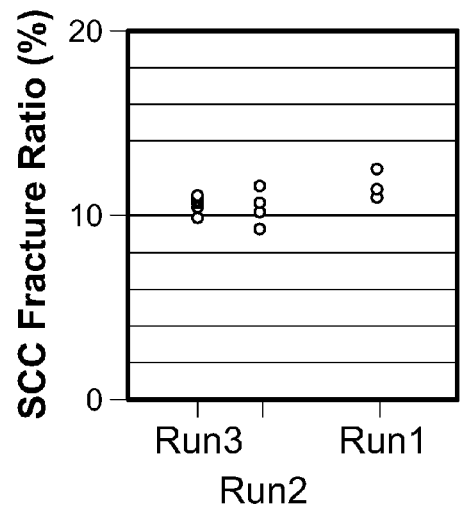
FIG. 5 illustrates slow strain rate test results.

The current invention uses a combination of empirical data and numerical analysis to quantitatively evaluate the effect of zinc addition on the initiation rate of PWSCC. The invention also provides for applying zinc acetate to the RCS of PWRs at a target zinc concentration of ≥10 ppb (versus the current range of 20 to 40 ppb), wherein the application reduces the initiation rate of PWSCC.

The developed methodology comprises the steps of quantitatively assessing the PWSCC initiation rate of the candidate plant through operational ET data and PWSCC failure history, using empirical and mathematical relationships, determining the extent of damage to the plant systems and approximating the point in plant life where zinc addition is needed for PWSCC mitigation. The methodology also provides for quantitatively assessing the PWSCC initiation benefit for various high-concentration (≥10 ppb) and low-concentration (<10 ppb) zinc programs, demonstrating a PWSCC initiation benefit from zinc at low concentrations (<10 ppb) in the RCS and applying zinc acetate to the RCS at concentrations of 1-10 ppb for PWSCC mitigation—concentrations that have proven to be safe for RCS materials of construction, including the nuclear fuel.

The invention and analysis techniques indicate that low concentration additions of zinc compounds, above the solubility of zinc chromite, in reactor coolant will result in PWSCC mitigation, in contravention of teachings of others in the art which require high concentration additions of zinc. A further aspect of the invention is that with the current zinc injection equipment and methods, PWSCC can be delayed in any of the pressurized water reactor plant currently injecting zinc.

An exemplary embodiment of the invention involves the combination of empirical field data, including eddy current test data and plant component PWSCC failure histories, with laboratory data as inputs to statistical analyses in order to prove the quantitative benefit of zinc addition on PWSCC initiation. The statistical analyses used to aggregate the data includes probabilistic analysis, e.g., Weibull analysis.

Eddy current data is obtained from a nuclear plant system that is to be evaluated for PWSCC. A non-limiting example of the data to be obtained and used in analysis is eddy current data based on information from a database recording analysis results, such as the EPRI Steam Generator Degradation Database. To successfully trend PWSCC, a normalized degradation rate is calculated, wherein the normalized degradation rate is defined as the number of tubes (or components) with new PWSCC indications divided by the number of rotating coil examinations in the examination region (TSP examinations or tubesheet examinations).

As PWSCC initiation has been shown to be very sensitive to temperature, a temperature scaling factor adjustment is made to the eddy current data, for example, the temperature scaling factor documented in reference EPRI NP-7493 can be applied to the PWSCC indication data.

A database of degradation rates is then developed for nuclear plant systems by adjusting the degradation data in the degradation database to a common reference temperature. Several temperatures are used to establish the reference temperature, including the reactor hot-leg temperature and the pressurizer temperature as non-limiting examples. The temperature correction is then applied to the degradation data as an adjustment in the Effective Full Power Years (EFPY) of plant operation.

Table 6 provides a cumulative PWSCC degradation rate as a function of EFPY adjusted for temperature for two example nuclear plants. The ratio column is obtained by taking the PWSCC Indications and dividing this number by the number of exams. The "cumulative" column adds the individual ratios provided up until that time. The final column in the table indicates the start of zinc addition as a binary value.

TABLE 6

PWSCC Summary for Zinc Plants

| Plant | EFPY | PWSCC Indications | Exams | Ratio | Cumulative | Zinc Addition |
|---|---|---|---|---|---|---|
| A | 1.25 | 0 | 431 | 0.0000 | 0.0000 | 0 |
| A | 2.27 | 0 | 430 | 0.0000 | 0.0000 | 0 |
| A | 4.49 | 0 | 2740 | 0.0000 | 0.0000 | 0 |
| A | 5.86 | 0 | 3020 | 0.0000 | 0.0000 | 0 |
| A | 7.14 | 33 | 2546 | 0.0130 | 0.0130 | 0 |
| A | 8.46 | 79 | 5821 | 0.0136 | 0.0265 | 0 |
| A | 9.75 | 131 | 15572 | 0.0084 | 0.0349 | 1 |
| A | 11.4 | 76 | 20086 | 0.0038 | 0.0387 | 1 |
| A | 12.87 | 59 | 19359 | 0.0030 | 0.0418 | 1 |
| A | 14.3 | 23 | 15821 | 0.0015 | 0.0432 | 1 |
| B | 2.05 | 0 | 229 | 0.0000 | 0.0000 | 0 |
| B | 3.16 | 0 | 420 | 0.0000 | 0.0000 | 0 |
| B | 4.43 | 0 | 2730 | 0.0000 | 0.0000 | 0 |
| B | 5.74 | 43 | 6101 | 0.0070 | 0.0070 | 0 |
| B | 7.08 | 16 | 4653 | 0.0034 | 0.0105 | 0 |
| B | 8.41 | 123 | 10711 | 0.0115 | 0.0220 | 0 |
| B | 10.03 | 66 | 16631 | 0.0040 | 0.0259 | 1 |
| B | 11.5 | 45 | 14950 | 0.0030 | 0.0289 | 1 |
| B | 12.93 | 28 | 14105 | 0.0020 | 0.0309 | 1 |
| B | 14.5 | 40 | 19059 | 0.0021 | 0.0330 | 1 |

A probabilistic predictive tool is then developed and used to correlate EFPY and the normalized degradation rate (the Ratio column in Table 6) in order to provide trending and predicting information. One such predictive tool to correlate EFPY and the normalized degradation rate is obtained by the Weibull analysis method.

When the data in Table 6 is analyzed to determine the Weibull slope for PWSCC initiation before and after the zinc addition, the results are those provided in Table 7.

TABLE 7

Weibull Analysis for PWSCC Initiation at Units A and B

| | | |
|---|---|---|
| All | slope | 1.751 |
| | intercept | −7.723 |
| | scale | 82.221 |
| Pre Zinc | slope | 2.844 |
| | intercept | −9.932 |
| | scale | 32.878 |
| Post Zinc | slope | 0.463 |
| | intercept | −4.496 |
| | scale | 16607 |

Figure 6:
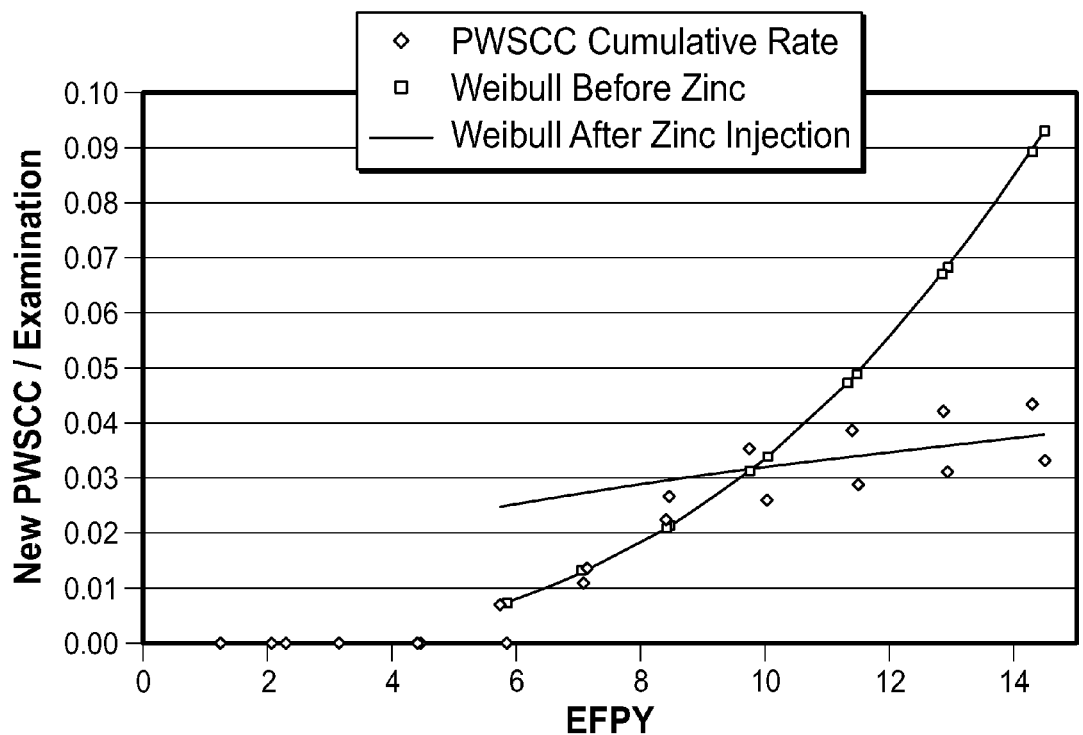
FIG. 6 illustrates a graphical depiction of the Weibull analysis of PWSCC initiation rate based on the normalized degradation data.

Finally, FIG. 6 gives a graphical depiction of the Weibull analysis of PWSCC initiation rate based on the normalized degradation data. FIG. 6 illustrates that applying this method allows for the quantification of the change in the degradation rate following zinc injection. The data in FIG. 6 illustrates that the PWSCC initiation rate (based on new indications normalized by the number of rotating coil examinations) had a Weibull slope of 2.844 for examinations prior to the start of zinc addition and a Weibull slope of 0.463 after beginning zinc addition. As a result, the Weibull slope indicates the effect of zinc addition on PWSCC at a nuclear power plant.

Low-Concentration Zinc Injection for PWSCC Mitigation Evaluation Literature (EPRI Document 1003389, November 2003) suggests that there is a direct relationship between radiation dose rates on reactor coolant system components and the amount of zinc injected into the system.

The present invention, however, involves the inventors discovery that the magnitude of PWSCC mitigation due to zinc injection at nuclear power plants is a function of the mass of zinc incorporated into the surface oxides of the reactor coolant system. Furthermore, the inventors have determined that the magnitude of PWSCC mitigation is not directly a function of zinc concentration in the reactor coolant because zinc uptake into the surface oxides is not significantly affected by coolant zinc concentration, as shown below.

Three different zinc injection programs were evaluated for zinc uptake by the reactor coolant oxides, and the data is presented in Table 8.

TABLE 8

Zinc Injection Summary of Plants L, M, and G

| PLANT | CYCLE NUMBER | NO. OF CYCLES | AVG. ZN CONC. | ZINC INJECTED | ZINC REMOVED | NET ZN IN RCS |
|---|---|---|---|---|---|---|
| A | 9 | 1 | 31 | 5.85 | 3.05 | 2.80 |
| A | 10 | 2 | 21 | 4.08 | 2.55 | 1.53 |
| A | 11 | 3 | 15 | 4.04 | 2.69 | 1.35 |
| B | 9 | 1 | 21 | 3.48 | 1.62 | 1.86 |
| B | 10 | 2 | 16 | 3.56 | 2.87 | 0.69 |
| B | 11 | 3 | 15 | 4.91 | 3.34 | 1.57 |
| C | 14 | 1 | 5 | 2.87 | 0.47 | 2.40 |
| C | 15 | 2 | 4.5 | 1.49 | — | — |
| C | 16 | 3 | 5 | 1.43 | 0.34 | 1.09 |

Table 8 indicates that test Plants A and B injected significantly more zinc in each of their cycles than did Plant C. Much of this zinc, however, was removed by the letdown demineralizers at Plants A and B and was therefore not incorporated into the surface oxide films (where it is effective in mitigating PWSCC). In contrast, Plant C had much lower zinc removal by the demineralizers. As a result, the actual amount of zinc remaining in the RCS at all three plants was similar for the first and third cycles of zinc injection (Cycle 15 data was not reported for Plant C). On average, Plants A and B had only 10% more zinc in the system than did Plant C. Additionally, Plant C is a smaller reactor than Plants A and B, so the zinc uptake would be expected to be proportionately smaller. In evaluating the data, however, plants B and C had almost equal zinc uptakes in their first and third cycles of zinc injection. When the data is corrected for the relative surface area of the units, Plant C actually incorporated more zinc per unit area than did Plants A and B (average of the two units).

Based on this data, the steady-state uptake rate of zinc into the RCS oxides is fairly independent of the RCS zinc concentration within the 5 to 30 ppb band, as long as the concentration is above the $ZnCr_2O_4$ solubility, contrary to expected results provided in other literature.

The significance of this evaluation is that zinc concentration in the reactor coolant (<10 ppb as Zn) that was originally thought to be too low for PWSCC mitigation is actually able to incorporate as much zinc into the RCS surface oxides (where Zn is effective) as a high-concentration program, provided that the reactor coolant zinc concentration is maintained above the solubility of zinc chromite. As a result, any amount of zinc in the reactor coolant in excess of the zinc chromite solubility limit will lead to an amount of PWSCC mitigation protection.

Low-concentration zinc programs (5 to 10 ppb Zn in the reactor coolant) can produce the same magnitude of PWSCC mitigation as high-concentration zinc programs (shown in FIG. 6). Operating a nuclear power plant with a low-concentration zinc program provides significant advantages over high-concentration programs, including the following: lower zinc costs, less tramp oxide (CRUD) deposited on the nuclear fuel rods, lower risk of CRUD-induced fuel damage, and lower risk of Axial Offset Anomaly (which results from boron uptake into CRUD.

The invention also provides a quantitative assessment of the potential benefits of zinc addition. To aid in this quantitative assessment, the Temperature Scaling Factor, as provided in the EPRI statistical analysis guidelines, is applicable for quantification of zinc addition benefits. The apparent activation energy is estimated at 50 kcal/mole. The adjustment for stress is the ratio of the stress levels to the fourth power.

When Weibull analysis is used for different temperatures or stress conditions, correction factors are provided in the EPRI statistical analysis guidelines.

Other factors such as material susceptibility and chemical environment may also be considered. ERPI NP 7493 and the U.S. Department of Commerce document ADA 143 100, Weibull Analysis Handbook, Nov 83, each provide some discussion about methods for extrapolation of Weibull analysis results from one case to another and are applicable herein.

The invention methodology applies the correction factors, as needed for each individual case, as adjustments in the service life of the components. Based on this methodology, the invention uses an actual EFPY for plotting data whereas an effective EFPY, adjusted for temperature and/or stress, is used to calculate a Weibull cumulative distribution. Based on the Weibull distribution and zinc improvement factors obtained from literature and/or field inspection data, the invention methodology calculates component degradation curves for zinc and no-zinc environments.

Example Calculation

An example calculation for the estimation of zinc improvement curves described above is performed for steam generator tubing of a PWR based on degradation data obtained from field inspections of an operating PWR using zinc addition.

The $T_{hot}$ for these data from the individual nuclear power plants was the same, so no Temperature Scaling Factor (TSF) was applied to the data. The reference data was based on 0.875 inch OD mill annealed tubing with a wall of 0.050 inch. The evaluation tubing is 0.625 inch OD sensitized tubing with a wall thickness of 0.037 inch. The respective yield strength values taken from the EPRI Steam Generator Degradation specific Management Flaw Handbook provides a stress correction factor of 0.90.

The plant under evaluation has documented six (6) tubes removed from service due to PWSCC (data from steam generator degradation database—excluding the explosive expansion region) with a rotating inspection program of approximately 2,249 from FDMS. This places the plant's degradation rate at about 0.0027 at 17.4 EFPY. Application of the stress factor places the effective plant life at 17.4*0.9 or 15.7 EFPY. Calculation of the actual lifetime associated with the 0.0027 degradation rate indicates an effective lifetime of 4.5 EFPY. This correlation to the actual plant degradation rate accounts for other factors such as plant chemistry and stress relief.

For the purpose of data review, a range of values is used for evaluating the relative potential benefit of zinc addition. These values, ranging from "Low Benefit" to "High Benefit" are based on laboratory data and field inspection data. When applied to the Weibull PWSCC slope and the corrected EFPY of the evaluation plant, the data provides an estimate of the range of PWSCC initiation benefit that can be expected from zinc addition.

Figure 7:
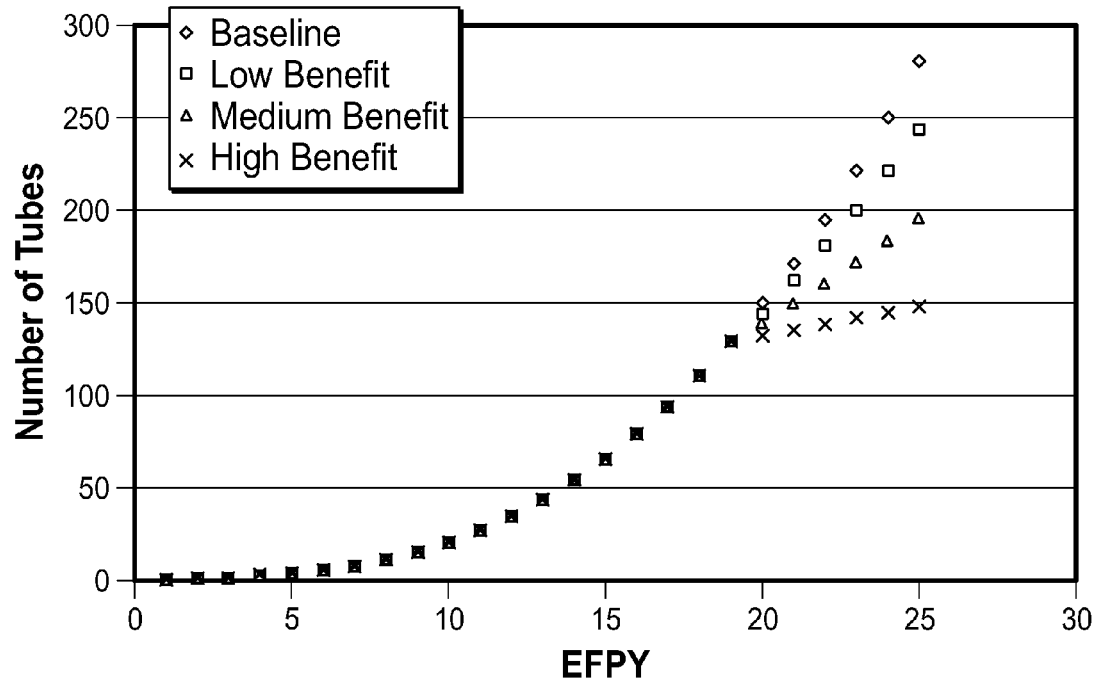
FIG. 7 is a graph of estimated steam generator pressurized water reactor stress corrosion cracking empirical alignment.

As an example, FIG. 7 shows the range of expected degradation using the evaluation plant EFPY corrected only by the stress ratio. The zinc addition effect is calculated from 19 EFPY.

As an alternative example of applying the invention methodology, available industry data on PWSCC failures can be used to construct these plots for components that do not have a large body of field inspection data (e.g., pressurizer nozzles). As part of the invention methodology development, various PWSCC failures from approximately 50 US and international PWRs were collected and used to build a database for the Weibull analyses.

In order to evaluate the industry data, the invention methodology groups the failures by component (e.g., CRDM, pressurizer nozzle, heater diaphragm). Once the data was compiled, the Weibull characteristics for each component were calculated, and those with similar slopes were grouped together for ease of analysis. Once these groupings were established, degradation curves were constructed for each group of components in a similar manner as previously discussed for the SG tubes.

Figure 8:
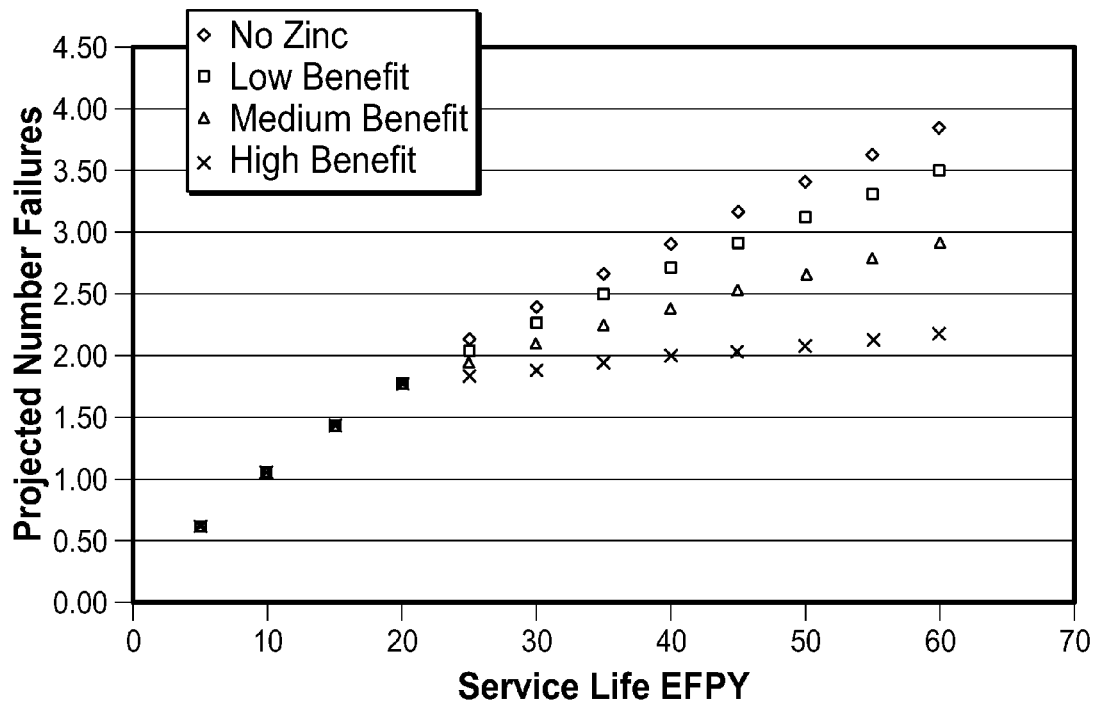
FIG. 8 is a graph of predicted pressurized degradation using a predictive analysis tool.

A sample curve for pressurized nozzles at the evaluation plant is presented in FIG. 8.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method to evaluate an effect of applying a zinc compound to a reactor coolant system of a pressurized water reactor, comprising:
   quantitatively assessing a pressurized water reactor stress corrosion cracking initiation rate of a candidate reactor coolant system through analysis of operational eddy current testing data and pressurized water stress corrosion cracking failure history using empirical relationships;
   determining an extent of damage to the candidate system;
   quantitatively assessing pressurized water stress corrosion cracking initiation benefit for high-concentration (>10 ppb) and low-concentration (<10 ppb) zinc addition programs;
   calculating a pressurized water stress corrosion cracking initiation benefit from zinc addition at low concentrations (<10 ppb) in the candidate system;
   approximating a time T when zinc addition at low concentrations (<10 ppb) in the candidate system is needed for pressurized water stress corrosion cracking mitigation; and
   applying zinc acetate to the reactor coolant system at the time T at concentrations of approximately between 1 to 10 parts per billion for pressurized water stress corrosion cracking mitigation,
   wherein zinc has not previously been applied to the candidate system and wherein the applying zinc acetate to the reactor coolant system at the time T at concentrations of approximately between 1 and 10 ppb for pressurized water stress corrosion cracking mitigation is not performed until after there are pressurized water stress corrosion cracking indications in the reactor coolant system.

2. The method according to claim 1, further comprising:
   applying a temperature scaling factor adjustment to the data to normalize differences between different locations within the reactor coolant system and between the reactor coolant system and reactor coolant systems of other pressurized water reactors.

3. The method according to claim 1, further comprising:
   developing a database of degradation rates, the database being adjusted to a common reference temperature.

4. The method according to claim 3, wherein the database is adjusted to effective full power years of operation of the pressurized water reactor.

5. The method according to claim 4, further comprising:
   developing a probabilistic predictive tool to trend and predict degradation in the reactor coolant system, the probabilistic predictive tool correlating the effective full power years of reactor operation and the normalized degradation rate.

6. The method according to claim 5, wherein the probabilistic predictive tool is developed from a change in a Weibull slope of pressurized water stress corrosion cracking initiation plotted data before and after zinc addition.

7. The method according to claim 1, further comprising:
   calculating a magnitude of pressurized water stress corrosion cracking mitigation due to zinc injection at nuclear power plants as a function of a mass of zinc incorporated into surface oxides of the reactor coolant system.

8. The method according to claim 1 wherein the applying zinc acetate to the reactor coolant system at the time T is performed at concentrations of approximately between 1 to 10 parts per billion that minimize a removal of zinc from the reactor coolant system.

9. The method according to claim 1 wherein the applying zinc acetate to the reactor coolant system at the time T at concentrations of approximately between 1 to 10 parts per billion for pressurized water stress corrosion cracking mitigation includes maintaining the zinc concentration in the reactor coolant system above the solubility of zinc chromite in the reactor coolant system.

10. A method to evaluate an effect of applying a zinc compound to a reactor coolant system of a pressurized water reactor, comprising:
   quantitatively assessing a pressurized water reactor stress corrosion cracking initiation rate of a candidate reactor coolant system through analysis of operational eddy current testing data and pressurized water stress corrosion cracking failure history using empirical relationships;

determining an extent of damage to the candidate system;

quantitatively assessing pressurized water stress corrosion cracking initiation benefit for high-concentration (>10 ppb) and low-concentration (<10 ppb) zinc addition programs;

calculating a pressurized water stress corrosion cracking initiation benefit from zinc addition at low concentrations (<10 ppb) in the candidate system;

approximating a time T when zinc addition at low concentrations (<10ppb) in the candidate system is needed for pressurized water stress corrosion cracking mitigation; and applying zinc acetate to the reactor coolant system at the time T at concentrations of approximately between 1 to 10 parts per billion for pressurized water stress corrosion cracking mitigation, wherein zinc has not previously been applied to the candidate system and wherein the step of quantitatively assessing a pressurized water stress corrosion cracking initiation rate of a candidate system through analysis of operational eddy current testing data and pressurized water stress corrosion cracking failure history using empirical relationships comprises calculating a normalized degradation rate define as a number of tubes with new pressurized water stress corrosion cracking indications divided by a number of rotating coil examinations in a region of the number of tubes.

* * * * *